UNITED STATES PATENT OFFICE.

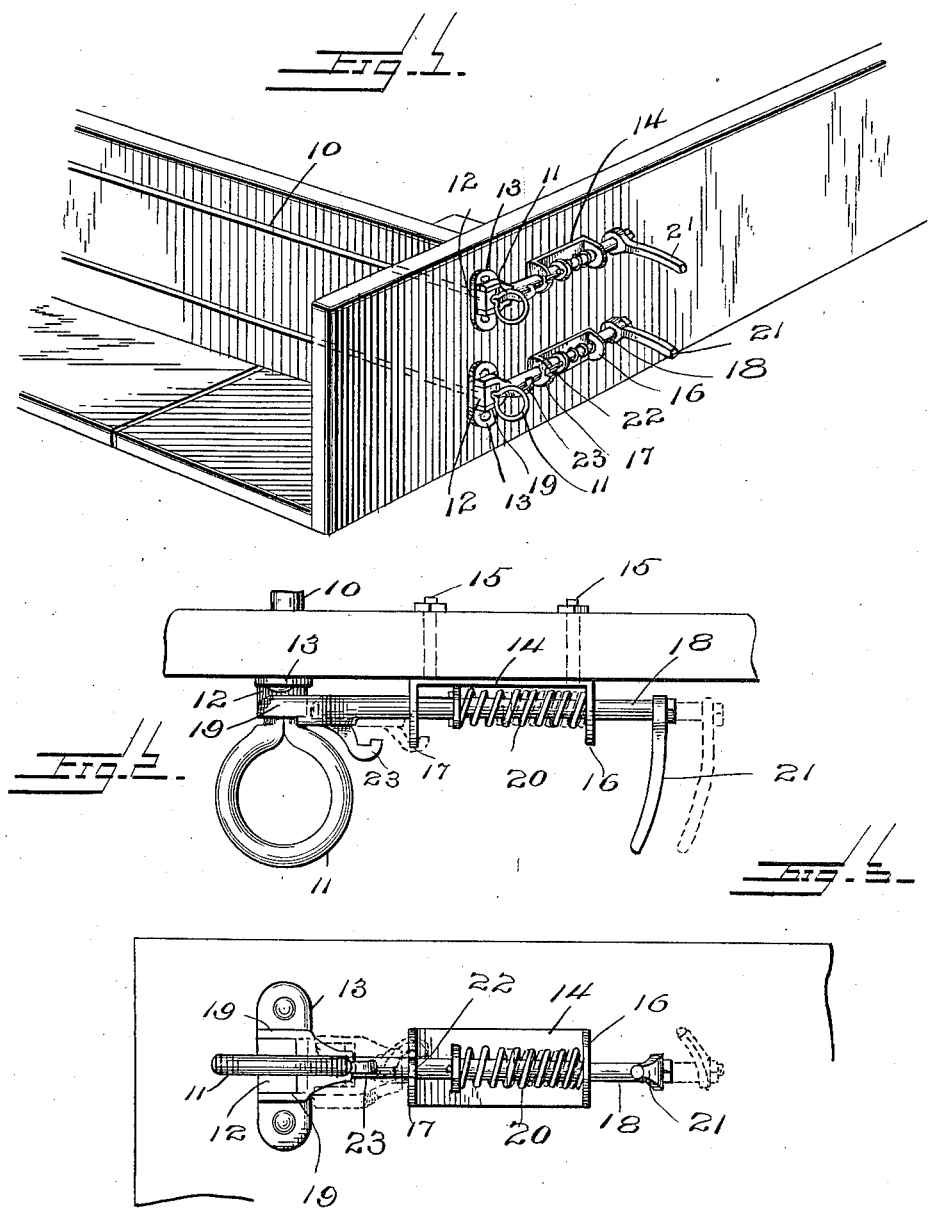

JOSEPH NOHAVA, OF GREGORY, SOUTH DAKOTA.

END-GATE-ROD LOCK.

1,030,117.  Specification of Letters Patent.   Patented June 18, 1912.

Application filed August 14, 1911. Serial No. 643,988.

*To all whom it may concern:*

Be it known that I, JOSEPH NOHAVA, a subject of the King of Bohemia, residing at Gregory, in the county of Gregory and State of South Dakota, have invented certain new and useful Improvements in End-Gate-Rod Locks; and I do hereby declare the following to be a full, clear, and exact description of the invention, such as will enable others skilled in the art to which it appertains to make and use the same.

This invention relates to end gate rod locks and has for an object to provide means for locking an end gate rod to prevent its rotating to unscrew out of position, and with means for disengaging the lock and retaining it in disengaged position.

A further object of the invention is to provide an end gate rod with a squared head or shoulder and with a spring-pressed lock having a bifurcated end adapted to engage over the squared nut and retain it in unlocked position.

With these and other objects in view the invention comprises certain novel constructions, combinations and arrangements of parts as will be hereinafter more fully described and claimed.

In the drawings:—Figure 1 is a view in perspective of a conventional wagon body with two of the locks applied thereto. Fig. 2 is a view in top plan of one of the improved locks showing it locked in full lines and unlocked in dotted lines. Fig. 3 is a view in front elevation of one of the improved locks showing it locked in full lines and unlocked in dotted lines.

Like characters of reference indicate corresponding parts throughout the several views.

In the usual and ordinary construction of end gate rods the rod is passed through one side of the wagon body and forms a screw connection with the opposite side. The rod is released by unscrewing the extremity of the rod and withdrawing it from both sides of the wagon body. When screwed in position, if the rod can be retained against rotation it is retained in position. In the drawings a conventional rod 10 is shown having the usual ring 11 by which the rod is handled and rotated. Adjacent the ring the rod is provided with a squared shoulder or head 12 which abuts against the escutcheon or wear iron 13 usually employed upon wagon bodies.

Adjacent the squared head of the end gate rod a plate 14 is secured in any approved manner, as by the bolts 15, having upturned ears 16 and 17 through which is slidably mounted a bolt 18. The bolt 18 is provided with a bifurcated end 19 proportioned to engage over the squared head 12 and is held yieldingly to position by a spring 20. The bolt is also provided with a finger 21 by which the same may be moved longitudinally to be disengaged from the squared head 12.

To permit the ready withdrawal of the end gate rod it is desirable to lock the reciprocating bolt 18 in unlocked position. For this purpose the ear 17 is provided with a notch 22 and the bolt 18 with a hook 23 proportioned to pass through the notch 22 and by a partial rotation of the bolt 18, as indicated at Fig. 3, to engage the hook over the ear 17 and retain the bolt in withdrawn position as indicated in dotted lines in Figs. 2 and 3.

I claim:—

1. The combination with an end gate rod having a multi-angular portion, of a plate mounted adjacent the rod and provided with an ear having a notch, a rod mounted to reciprocate through the ear and having a bifurcated end proportioned to engage over the multi-angular portion of the rod, and a hook carried by the bolt adapted to pass through the notch and engage the ear.

2. The combination with an end gate rod having a multi-angular portion, ears outstanding adjacent the rod, one of which is provided with a notch, a bolt mounted to reciprocate within the ears, a spring adapted to hold the bolt yieldingly in engagement with the end gate rod, and a hook rigidly carried by the bolt adapted to pass through the notch in the ear and when the bolt is turned to engage behind such ear.

In testimony whereof I affix my signature in presence of two witnesses.

JOSEPH NOHAVA.

Witnesses:
FRANK LUNDAK,
FRANK BALEY.

Copies of this patent may be obtained for five cents each, by addressing the "Commissioner of Patents, Washington, D. C."